July 2, 1935.  C. KRAUCH ET AL  2,006,996
CONVERSION OF SOLID FUELS AND PRODUCTS DERIVED THEREFROM
OR OTHER MATERIALS INTO VALUABLE LIQUIDS
Filed July 29, 1932
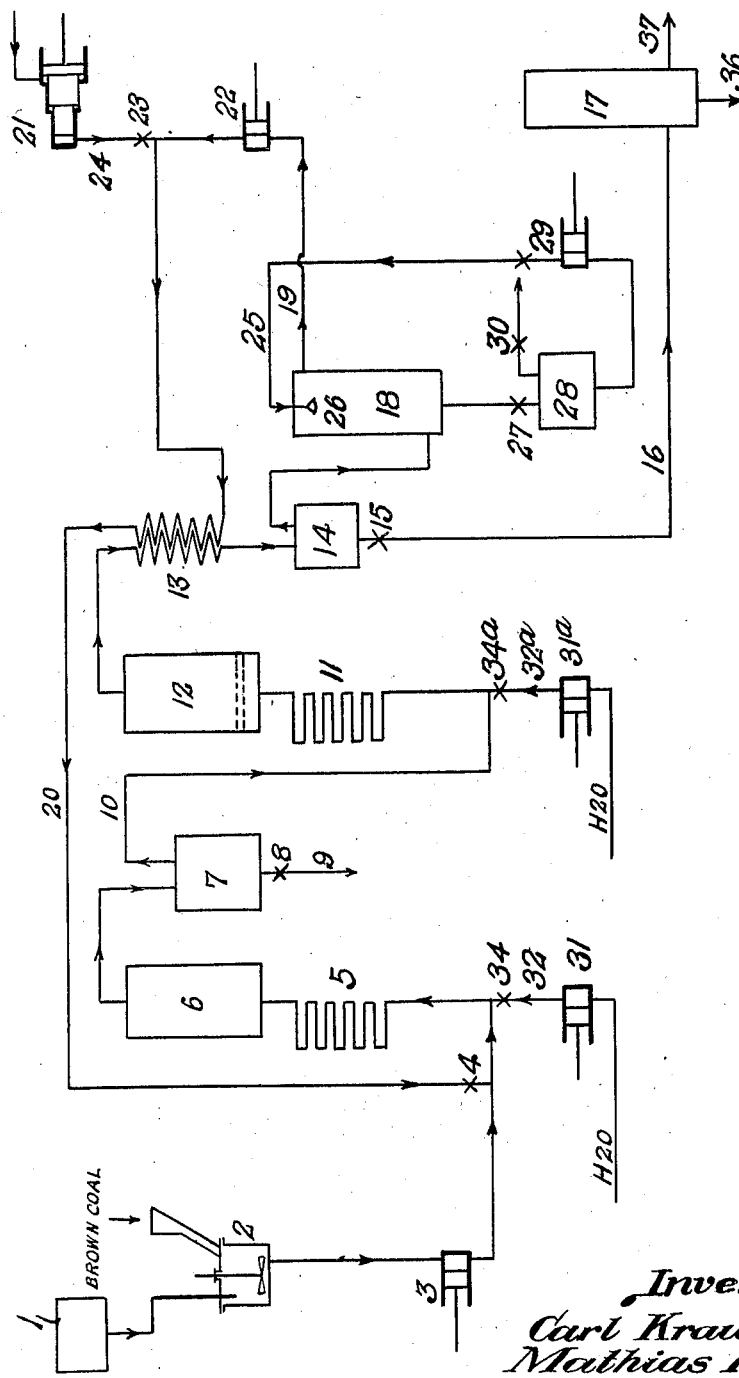
Inventors:
Carl Krauch and
Mathias Pier
by Hauff & Barland, attys.

Patented July 2, 1935

2,006,996

UNITED STATES PATENT OFFICE 2,006,996

CONVERSION OF SOLID FUELS AND PRODUCTS DERIVED THEREFROM OR OTHER MATERIALS INTO VALUABLE LIQUIDS

Carl Krauch, Ludwigshafen-on-the-Rhine, and Mathias Pier, Heidelberg, Germany, assignors to Standard-I. G. Company, Linden, N. J., a corporation of Delaware Application July 29, 1932, Serial No. 625,653
In Germany February 14, 1925

20 Claims. (Cl. 196—53)

Our invention relates to the destructive hydrogenation of carbonaceous materials and, in particular, to that process which is carried out in the presence of a catalyst immune to sulphur poisoning as described and claimed in our co-pending application Ser. No. 86,646, now Patent No. 1,890,434, of which this application is a continuation-in-part.

The object of our invention is to provide a catalyst which will act efficiently in the promotion of the conversion of carbonaceous substances into valuable liquids by destructive hydrogenation.

In our application No. 86,646, we have stated that a mixed catalyst containing an inorganic sulphide, particularly a sulphide of a metal of the sixth group and a substance selected from the group consisting of zinc oxide, alumina, zinc carbonate, magnesia, calcium carbonate and manganese carbonate, possesses especial efficiency as a catalyst for the destructive hydrogenation of carbonaceous materials. It is to the utilization of these mixed catalysts in the destructive hydrogenation of carbonaceous materials that this application is directed.

Among the specific mixtures most eminently suited for the purpose intended may be mentioned molybdenum sulphide and alumina, cobalt sulphide and zinc oxide or zinc carbonate, molybdenum sulphide and magnesia or calcium carbonate, if desired together with molybdenum, tungsten sulphide and magnesia, uranium sulphide and alumina, manganese sulphide and zinc carbonate. These mixed catalysts may be caused to act on the solid or liquid carbonaceous material in any suitable manner. They may be added to the solids or liquids, or in the case of liquids, they may be placed in the reaction vessel and the liquids brought into contact with them in a vaporized or other finely divided state. The said oxides or carbonates may be present in the mixture with said sulphides in any proportion since even small amounts of the one constituent promote the activity of the other, but it is preferable to operate with mixtures in which each constituent is present in an amount of more than 5, and more particularly of more than 10 per cent.

The catalysts employed according to the present invention promote the hydrogenation of the hydrocarbons as well as the splitting thereof into lower molecular hydrocarbons.

As a further example of a catalyst immune to sulphur poisoning and adapted to be used in this process, we cite alumina.

As regards the materials to be treated, the invention can be applied to any sort of solid fuels, for example, hard or soft coal, brown coal, lignite, peat, wood, or similar materials, mineral oils, shale oils, or other solid or liquid bitumina, also distillation or extraction products of all of them, such as tars obtained therefrom, whether by ordinary destructive distillation or by low temperature carbonization, or brown coal bitumen, or tars or oils obtained by pressure hydrogenation of solid or liquid fuels, or components or conversion products of all the above mentioned materials, such as cracked products, coumarone or any other resins or residues of their distillation, pitch, asphaltum and so on, or mixtures of several such products with each other, also of solids with the above-named liquids or of one or more of such products with other suitable organic liquids.

Especially when employing coal or liquid fuels, an addition of lignite or peat is often of advantage, often increasing the hydrogenizing action, avoiding several drawbacks and, in the case of solid substances, rendering their introduction easier. All the said materials may be used in the presence of substantial amounts of water and, if desired, water may be added as such. Sometimes the process of hydrogenation is hereby furthered. For example, lignite producer tar containing from 40 to 50 per cent of water may be used to advantage directly.

The preferred form of carrying out the process is generally a continuous operation with a stream of the gases and with an excess thereof over the required quantity and preferably while maintaining the desired pressure by adding fresh gas and passing the gas either by circulation through one or more reaction vessels or through a succession of several reaction vessels. The material to be converted is supplied at a proper place and the products are separated from the reaction gases by cooling.

We further discovered that the process according to the present invention is in many cases, and in particular when converting solid fuels or heavy oils or residues, greatly improved by being carried out in two parts or stages. In the first stage, the coal, tars or heavy petroleum products are converted into liquids poor in fractions of low boiling point by liquefaction or destructive hydrogenation with or without catalysts, while in the second stage the products of stage one are transformed into hydrocarbons of low boiling point, by destructive hydrogenation, but preferably with the aid of catalysts. Increased pressure is preferably employed in one or both stages. Insofar as catalytic masses are added in both stages, they may be of the same kind or different in quantity, concentration, or kind. The two stages can be effected in two separate or adjoining reaction vessels or in different parts of a single vessel constructed in a suitable manner. Even more than two stages may be employed successively in certain cases.

The gases serving for the reaction may consist of hydrogen alone or of mixtures containing hydrogen, for example a mixture of hydrogen with nitrogen, or water gas, or hydrogen mixed with carbon dioxide, hydrogen sulphide, water vapor or methane or other hydrocarbons. Or the hydrogen may be generated in the reaction chamber by the interaction of water and carbon monoxide, and by similar reactions. When employing nitrogen compounds as catalysts, and carbon monoxide and water, the gas must be employed in a stream.

The process is best carried out under elevated or even strongly elevated pressure and most suitably with a stream of the gas passed through or over the material to be treated or carrying it along through the reaction vessel by which method the production obtained by the process is very large.

Depending on the conditions of working, for example, temperature and pressure employed or duration of the treatment, the products are poor or rich in products of low boiling point. Generally, the temperature ranges between 300 and 700 degrees centigrade, and the pressure, when used, should amount to at least 20 atmospheres and should preferably be much higher up to about 2000 atmospheres.

The process according to the present invention is preferably carried out in vessels constructed of or lined with highly alloyed steels as for example chromium nickel steel or chromium steel.

In the following examples the time of reaction varies considerably, as might be supposed, depending on the nature of the raw material, the activity of the catalyst, temperature, pressure, and the like. In practice it is desirable to make a few preliminary runs in order to determine the time required for the best yields under a given set of conditions. Generally speaking, with batch operations, the total time may be from two to ten hours or more, depending on the yield desired, while with continuous operations the time is usually shorter. When continually feeding liquid or difficultly vaporizable oils, the rate of flow may be in the neighborhood of .3 to .8 volume of oil per hour per volume of reaction space. Vaporous materials may be treated at higher temperatures and the feed rate may consequently be one or even one and one-half volumes per hour per volume of reaction space. The volume of hydrogen may likewise vary considerably and should always, of course, be in excess of that actually required for the conversion; for example, the rate of flow of hydrogen may be in excess of about 600 litres per kilogram of carbonaceous material.

A suitable arrangement of apparatus for carrying out the process is illustrated in the accompanying drawing. The process may be further described with reference thereto.

Finely ground brown coal is pasted in the mixing vessel 2 with oil from the tank 1 and the mixture is thereafter forced by means of pump 3 together with hydrogen which is supplied from conduit 20, through the pre-heater 5, into the reaction vessel 6. The regulation of the amount of hydrogen necessary for the conversion is effected by means of valve 4. The separation of the solid and fluid and gaseous and vaporous portions takes place in the separator 7. The fluid and solid portions are released through valve 8 and removed from the reaction system through conduit 9, whereas the gaseous and vaporous parts are further heated in a coil 11 and then conducted into the second vessel 12, which is filled with molybdenum sulphide and alumina. The distilled reaction products give off their heat in the heat exchanger 13 to the entering hydrogen and are thereby condensed. The obtained low boiling products are released from the stripper 14 through valve 15 and are conducted into a supply tank 17 by means of a conduit 16, whereas the hydrogen is conducted into the washer 18 and is there freed from the gaseous hydrocarbons with the assistance of oil. The oil is introduced into the upper part of the washer by means of conduit 25, sprayed through a nozzle 26 and again drawn off on the bottom. The oil is released through valve 27 into a receiver 28, from which the dissolved hydrocarbons escape through conduit 30. The oil is drawn off by means of pump 29, compressed and returned into the washer. The purified hydrogen leaves the washer through conduit 19 and is re-introduced into the system by the rotating pump 22 through conduit 20. Fresh hydrogen, compressed by means of compressor 21, may be introduced through conduit 24, the amount of such hydrogen being regulated by valve 23.

In case a catalyst is used in the first step, the addition is preferably made in the mixing vessel 2.

In case the conversion is to be made in the presence of water vapor, water is introduced by means of pumps 31 and 31a respectively, through conduit 32, into the reaction vessel 6, or through conduit 32a into the second reaction vessel 12. The regulation of the necessary amount of water is effected by means of valves 34 and 34a respectively. The water evaporates in the coils 5 and 11, is condensed behind the reaction oven in the heat exchanger 13 and collected at the bottom of tank 17. From there it may be drawn off through conduit 36, whereas the benzine is removed through an opening 37 positioned at a higher level in the tank.

The following examples will serve to further explain how our invention is carried out in practice, but we do not restrict our invention to these examples.

*Example 1*

Brown coal tar obtained in a gas producer fed with brown coal, is vaporized at a temperature of 500 degrees centigrade and under a pressure of about 150 atmospheres, in a current of hydrogen and the mixture is continuously passed over a contact mass consisting of a mixture of molybdenum sulphide with an addition of 8 per cent its weight of alumina. The gas is pumped round in a circular way while maintaining the pressure by an addition of fresh hydrogen, and separating the material by cooling. There is formed a mobile and nearly colorless product free from phenols, without any formation of coke, asphalt or other residue. From 30 to 40 per cent of the product distill up to 150 degrees centigrade, and the fractions up to 300 degrees centigrade are colorless and fully saturated. At 350 degrees centigrade only a small residue is left having a vaseline-like nature. The raw product can be used as a motor fuel or for manufacturing lubricating oils. An addition of say 1 per cent of ammonia to the hydrogen is also useful.

A mixture consisting of 75 per cent, by volume, of hydrogen and 25 per cent of nitrogen may also be used, preferably at a pressure of 200 atmospheres.

Example 2

Brown coal producer tar is continuously passed together with a current of hydrogen, under a pressure of 800 atmospheres and at a temperature of about 500 degrees centigrade over a catalyst consisting of zinc oxide and uranium sulphide. The product obtained consists of up to 30 per cent of gasoline.

Example 3

Vaporized brown coal tar is incorporated with hydrogen and brought under a pressure of 200 atmospheres and the mixture is passed at about 450 degrees centigrade over a catalyst prepared from 10 parts of zinc oxide and 90 parts of chromium sulphide. On cooling, a product is condensed which contains about 25 per cent of benzine and products of a higher boiling point which may serve for a conversion into lubricating oils or for a repeated treatment as aforementioned. The hydrogen is circulated while replacing the consumed gases.

Example 4

Lignite, whether alone or mixed with mineral or tar oil, is continuously fed into a high pressure reaction vessel in which it is exposed to the action of a current of hydrogen in excess of the consumed quantity under a pressure of 200 atmospheres and at a temperature of about 480° C., while the solid or pasted material is slowly moved forward through the reaction vessel. The hot gas current containing the products formed by the interaction with hydrogen is passed into a second reaction vessel also capable of withstanding the pressure, which latter is maintained and which vessel is supplied with precipitated calcium carbonate in lumps coated with molybdenum sulphide and heated to from 500° to 550° C. whereupon the gases are cooled after having transferred heat to the gas entering the first vessel; a mobile oil collects in the cool receiver containing about 50 per cent, or more, of benzine of low boiling point. The gas is freed from gaseous hydrocarbons which are present in a small amount and is then passed with an addition of fresh hydrogen to make up for the consumed amount thereof, by means of a circulating pump, successively through the first and second vessel and the cooler and so forth. The solid residue, chiefly ashes, left by the treatment of the brown coal is suitably withdrawn between the first and second vessel. By this treatment 70 or more per cent of the carbon content of the lignite is easily and quickly converted in a continuous manner into valuable hydrocarbons.

A catalyst of the character described above may also be employed in the first stage.

Our invention is not confined to the above examples; the conditions may be widely varied in various directions. For example, the pressures and temperatures may be higher or lower than stated above.

In the appended claims, the expression "distillation and extraction products thereof" is intended to relate only to solid and liquid distillation and extraction products and is not to be construed to include gaseous products of the distillation of solid and liquid fuels.

What we claim is:—

1. The process of destructively hydrogenizing carbonaceous substances, such as solid and liquid fuels, distillation and extraction products thereof, which comprises treating them with hydrogen in the presence of an added solid mixture of heavy metal sulphide with a substance selected from the group consisting of zinc oxide, zinc carbonate, alumina, magnesia calcium carbonate and manganese carbonate, and heat at a temperature between about 300° and 700° C., sufficient to promote the reaction, and at a pressure of at least 20 atmospheres.

2. The process of destructively hydrogenizing carbonaceous substances, such as solid and liquid fuels, distillation and extraction products thereof which comprises treating them with hydrogen in the presence of an added solid mixture of a heavy metal sulphide with a substance selected from the group consisting of zinc oxide, zinc carbonate, alumina, magnesia, calcium carbonate and manganese carbonate, and heat at a temperature between about 300° and 700° C., sufficient to promote the conversion and at a pressure of at least 20 atmospheres, the conditions of working, such as temperature, pressure and the efficiency of the catalyst, being so adapted to each other as to give rise to the formation of substantial amounts of low boiling hydrocarbons of a benzine character.

3. The process of destructively hydrogenizing carbonaceous substances, such as solid and liquid fuels, distillation and extraction products thereof, into valuable liquids, which comprises treating them with a stream of hydrogen in the presence of an added solid mixture of a heavy metal sulphide with a substance selected from the group consisting of zinc oxide, zinc carbonate, alumina, magnesia, calcium carbonate and manganese carbonate, and heat at a temperature between about 300° and 700° C., sufficient to promote the conversion and at a pressure of at least 20 atmospheres.

4. The process of destructively hydrogenizing carbonaceous substances, such as solid and liquid fuels, distillation and extraction products thereof which comprises treating them with hydrogen, in the presence of an added solid mixture of a heavy metal sulphide with a substance selected from the group consisting of zinc oxide, zinc carbonate, alumina, magnesia, calcium carbonate and manganese carbonate and of a substntial amount of water, and heat at a temperature between about 300° and 700° C., sufficient to promote the reaction and at a pressure of at least 20 atmospheres.

5. The process of converting carbonaceous substances, such as solid and liquid fuels, distillation and extraction products thereof, into valuable liquids which comprises treating them with hydrogen, in the presence of an added solid mixture of a heavy metal sulphide with a substance selected from the group consisting of zinc oxide, zinc carbonate, alumina, magnesia, calcium carbonate and manganese carbonate, and heat at a temperature of between about 300° and 700° C. and at a pressure of at least 50 atmospheres.

6. The process of converting carbonaceous substances, such as solid and liquid fuels, distillation and extraction products thereof, into valuable liquids which comprises treating them with hydrogen, in the presence of an added solid mixture of a heavy metal sulphide with a substance selected from the group consisting of zinc oxide, zinc carbonate, alumina, magnesia, calcium carbonate and manganese carbonate and of substantial amount of water, and heat at a temperature of between about 300° and 700° C. and at a pressure of at least 50 atmospheres.

7. The process of producing liquids from solid fuel materials which comprises destructively hydrogenating the initial material, in the presence of an added solid mixture of a heavy metal sulphide with a substance selected from the group consisting of zinc oxide, zinc carbonate, alumina, magnesia, calcium carbonate and manganese carbonate, at a pressure of at least 20 atmospheres and at a temperature of between about 300° and 700° C.

8. The process of producing liquid hydrocarbons from lignite which comprises destructively hydrogenating the initial material in the presence of an added solid mixture of a heavy metal sulphide with a substance selected from the group consisting of zinc oxide, zinc carbonate, alumina, magnesia, calcium carbonate and manganese carbonate, at a pressure of at least 20 atmospheres and at a temperature of between about 300° and 700° C.

9. The process of converting carbonaceous substances, such as solid and liquid fuels, distillation and extraction products thereof, into valuable liquids which comprises treating them with a continuous stream of hydrogen and a substantial amount of water and heat at a temperature of between about 300° and 700° C. and at a pressure of at least 50 atmospheres in the presence of an added solid mixture of a heavy metal sulphide with a substance selected from the group consisting of zinc oxide, zinc carbonate, alumina, magnesia, calcium carbonate and manganese carbonate.

10. The process of converting carbonaceous substances, such as solid and liquid fuels, distillation and extraction products thereof into valuable liquids which comprises treating a mixture of one of said substances with another of said substances of more recent geological age than the first by destructive hydrogenation in the presence of an added solid mixture of a heavy metal sulphide with a substance selected from the group consisting of zinc oxide, zinc carbonate, alumina, magnesia, calcium carbonate and manganese carbonate, under a pressure of at least 20 atmospheres and at a temperature of between about 300° and 700° centigrade.

11. The process of destructively hydrogenizing carbonaceous substances, such as solid and liquid fuels, distillation and extraction products thereof, into valuable liquids which comprises treating them with hydrogen in the presence of an added solid mixture of a heavy metal sulphide with a substance selected from the group consisting of zinc oxide, zinc carbonate, alumina, magnesia, calcium carbonate and manganese carbonate, at a temperature between about 300° and 700° C., sufficiently high for the conversion and at a pressure of at least 20 atmospheres for a period such that, under the conditions as above given, the product is substantially free from asphalt.

12. The process of destructively hydrogenizing carbonaceous substances, such as solid and liquid fuels, distillation and extraction products thereof, containing asphaltic hydrocarbons, into valuable liquids which comprises treating them with hydrogen in the presence of an added solid mixture of a heavy metal sulphide with a substance selected from the group consisting of zinc oxide, zinc carbonate, alumina, magnesia, calcium carbonate and manganese carbonate, at a temperature between about 300° and 700° C., sufficiently high for the conversion and at a pressure of at least 20 atmospheres for a period such that, under the conditions as above given, the product is substantially free from asphalt.

13. The process of converting carbonaceous substances such as solid and liquid fuels, distillation and extraction products thereof, into valuable liquids which comprises continuously feeding said substances with hydrogn into a reaction space containing an added solid mixture of a heavy metal sulphide with a substance selected from the group consisting of zinc oxide, zinc carbonate, alumina, magnesia, calcium carbonate and manganese carbonate and held at temperature of between about 300° and 700° centigrade while maintaining a pressure of at least 20 atmospheres in said space and continuously removing resulting products.

14. The process of converting carbonaceous substances such as solid and liquid fuels, distillation and extraction products thereof, into valuable liquids which comprises treating them with a stream of hydrogen in the presence of an added solid mixture of a heavy metal sulphide with a substance selected from the group consisting of zinc oxide, zinc carbonate, alumina, magnesia, calcium carbonate and manganese carbonate, and heat at a temperature of between about 300° and 700° centigrade and at a pressure of at least 20 atmospheres and carrying off resulting products in the vapor state in the stream of hydrogen.

15. The process of destructively hydrogenizing carbonaceous substances such as solid and liquid fuels, distillation and extraction products thereof, into valuable liquids which comprises treating them with a stream of hydrogen in the presence of an added solid mixture of a heavy metal sulphide with a substance selected from the group consisting of zinc oxide, zinc carbonate, alumina, magnesia, calcium carbonate and manganese carbonate, and heat at a temperature between about 300° and 700° C., sufficiently high for the conversion and at a pressure of at least 20 atmospheres, carrying off resulting products in the vapor state in the stream of hydrogen and cooling the mixed vapors whereby the liquefiable portions of the said products are substantially completely removed from the hydrogen.

16. The process of converting carbonaceous substances, such as solid and liquid fuels, distillation and extracting products thereof into valuable liquids, which comprises treating them with added hydrogen and an added alumina, and heat at a temperature of between about 410° and 450° centigrade and at a pressure of at least 50 atmospheres.

17. The process of destructively hydrogenizing carbonaceous substances, such as solid and liquid fuels, distillation and extraction products thereof, which comprises treating them with hydrogen in the presence of an added mixture of a sulphide of a metal from group 6 of the periodic system with a substance selected from the group consisting of zinc oxide, zinc carbonate, alumina, magnesia, calcium carbonate and manganese carbonate, and heat at a temperature, between 300° and 700° C., sufficient to promote the reaction, and at a pressure of at least 20 atmospheres.

18. The process of destructively hydrogenizing carbonaceous substances, such as solid and liquid fuels, distillation and extraction products thereof, which comprises treating them with hydrogen in the presence of an added mixture of a sulphide of a metal from the iron group with a substance selected from the group consisting of zinc oxide, zinc carbonate, alumina, magnesia, calcium carbonate and manganese carbonate, and heat at a temperature, between 300° and 700° C., sufficient to promote the reaction, and at a pressure of at least 20 atmospheres.

19. The process of destructively hydrogenizing carbonaceous substances, such as solid and liquid fuels, distillation and extraction products thereof, which comprises treating them with hydrogen in the presence of an added mixture of a sulphide of a metal selected from the group consisting of molybdenum and tungsten with a substance selected from the group consisting of zinc oxide, zinc carbonate, alumina, magnesia, calcium carbonate and manganese carbonate and heat at a temperature, between 300° and 700° C., sufficient to promote the reaction, and at a pressure of at least 20 atmospheres.

20. The process of destructively hydrogenizing carbonaceous substances, such as solid and liquid fuels, distillation and extraction products thereof, which comprises treating them with hydrogen in the presence of an added mixture of cobalt sulphide with a substance selected from the group consisting of zinc oxide, zinc carbonate, alumina, magnesia, calcium carbonate and manganese carbonate and heat at a temperature between 300° and 700° C., sufficient to promote the reaction, and at a pressure of at least 20 atmospheres.

CARL KRAUCH.
MATHIAS PIER.